T. H. LODGE.
JOINER'S TRENCHING TOOL.
APPLICATION FILED JULY 24, 1919.
1,432,072.
Patented Oct. 17, 1922.
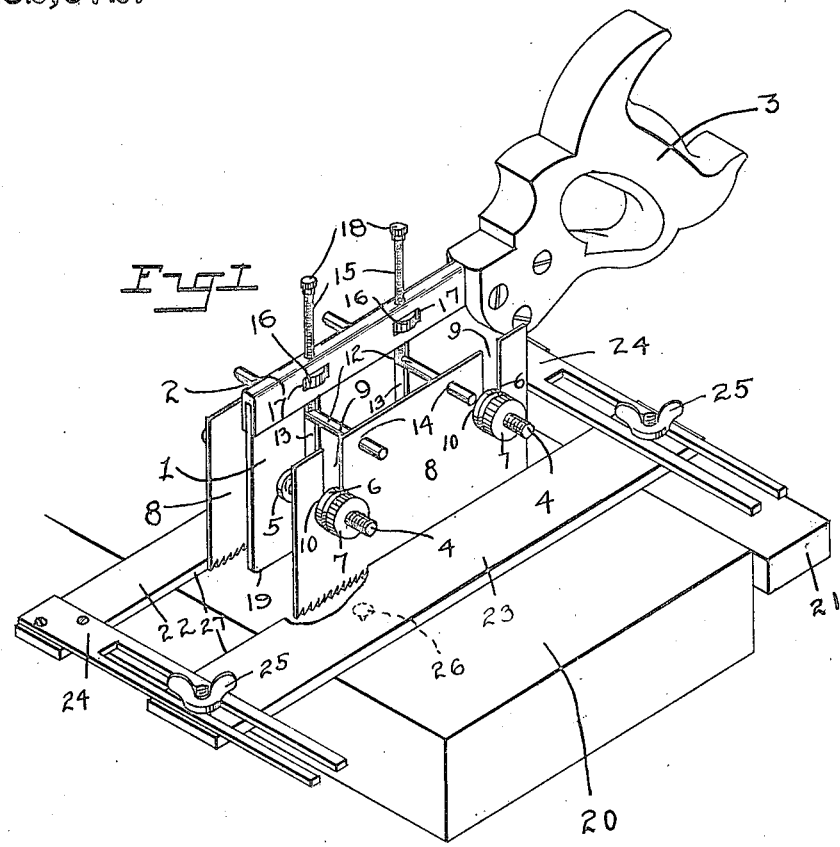
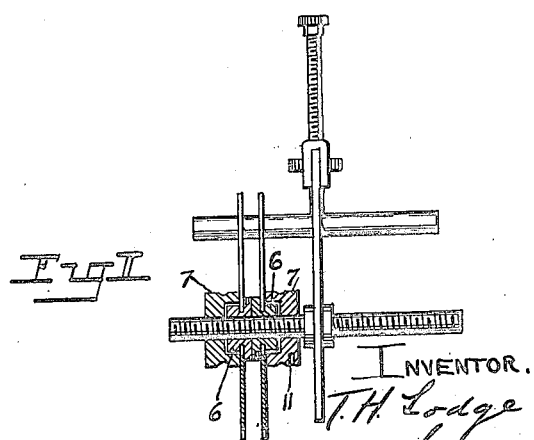
WITNESSES.
Emma Wehmeyer
Katherine J. Miller
INVENTOR.
T. H. Lodge
ATTORNEY.

Patented Oct. 17, 1922.

1,432,072

UNITED STATES PATENT OFFICE.

THOMAS H. LODGE, OF JOHANNESBURG, TRANSVAAL, SOUTH AFRICA.

JOINER'S TRENCHING TOOL.

Application filed July 24, 1919. Serial No. 312,948.

*To all whom it may concern:*

Be it known that THOMAS HESLOP LODGE, a British subject, residing at Railway Institute, Smit Street, Braamfontein, Johannesburg, Transvaal, Province of the Union of South Africa, has invented certain new and useful Improvements in Joiners' Trenching Tools, of which the following is a specification.

The object of the present invention is to facilitate the operation of trenching, that is grooving a board across the grain.

This operation is commonly effected by scribing off the edges of the grooves on the face of the board, scribing the profile of the groove on the edge of the board, separately sawing each scribed line on the face of the plank and meanwhile observing the depth of the cut at the edge of the plank, and finally routing out the wood between the saw cuts.

The present invention consists in a sawing tool designed to do away with several of the steps mentioned above and to enhance the accuracy of the work done.

In the accompanying drawing—

Fig. I is a projected view showing the tool in use.

Fig. II is an end view partly in section of the sawing tool with the parts shifted as compared with Fig. I.

Fig. III shows a detail of the blade of the square hereafter referred to.

1 indicates a metal plate which may be stiffened by a back rib 2 and which is fitted with a saw handle 3.

4, 4 indicate two arms projecting transversely from the plate 1, being secured thereto for instance by lock nuts 5. The arms are screw threaded and each carries two sets of nuts 6, 7.

8, 8 are the two saw blades arranged parallel to and supported by the plate 1. They are slotted at 9 to pass over the arms 4. Seated in each slot 9 is nut 6 (Fig. II) grooved at 10 to engage the blade, and having milled edges for turning. The blades are set at the desired distance apart by screwing the nuts 6 along the arms 4; and they are locked in position by the lock nuts 7. Said nuts 7 are provided with tommy holes 11 for tightening them.

For setting the blades 8 vertically with respect to the plate, to determine the depth of the cut, yokes 12 extend through vertical slots 13 in the plate 1 and through holes 14 in the blades 8. From each such yoke projects a screwed rod 15 engaged by a nut 16 seated in a slot 17 formed through the rib 2. By turning said nuts 16 after the lock nuts 7 have been loosened, both blades are shifted upwards or downwards with respect to the plate 1; and they are finally secured in the desired position by tightening the lock nuts 7.

In order to make the blades 8 readily detachable for renewal or other purposes, the vertical rods 15 are screwed into the yokes 12; their engagement being sufficiently stiff to prevent said rods from being rotated by the rotation of the nuts 16. The upper ends of the rods are formed with milled heads 18 and by screwing them out of engagement with the yokes 12, the latter are freed and can be withdrawn endwise, through and away from the plate and blades. The latter can then be slipped downwards off the arms 4.

In using the sawing tool the blades 8 are set apart equally to the width of the trench to be cut and are also set to project beyond the lower edge 19 of the plate 1, a distance equal to the depth of the trench. A double cut is then made across the face of the board 20 with both blades acting together, the cutting being automatically stopped at the required depth, by the lower edge 19 of the plate 1 coming into contact with the surface of the board. The wood between the saw cuts is then routed out in the usual manner, so completing the trench. When cutting narrow trenches, both blades may be secured on one side of the plate as shown in Fig. II.

In order to guide the tool accurately when cutting and to save the necessity of scribing one edge of the trench on the face of the board, the modified joiner's square shown in Fig. I is provided. This consists of an ordinary square comprising a stock 21 to engage the edge of the plank 20 and a blade 22 to lie on the face of the same. A bar 23 is attached to the blade 22 by slotted arms 24 and clamp nuts 25, so that it can be adjusted to and from the blade and remain parallel with the same. In the underside of the blade is a small tooth 26 adapted to enter the surface of the board.

The bar 23 is so set as to leave between it and the blade 22 a parallel side opening 27 equal to the width to which the saw blades 8 have been set.

The only scribing necessary is to make a short mark on the edge or face of the board to determine the position of one edge of the proposed trench.

The square previously set as described, is positioned with its stock on the edge of the board and the edge of the blade on the mark. It is held firmly in this position by striking the blade above the tooth 26 so as to force the latter into the board, and by the joiner pressing against the stock 21 with his body. The sawing tool is then set in the channel 27 between the blade and the bar and the double saw cut is made without the possibility of its wandering.

I claim:

1. In a joiner's trenching tool, the combination of a support provided with a saw handle, arms extending from said support and saw blades carried on said arms and adjustable along the same, yokes extending laterally from the support and engaging said blades for vertical movement, and screw means for adjusting said yokes vertically with regard to the support.

2. A joiner's trenching tool comprising a support having a handle and a guiding surface, screw threaded arms extending laterally from said support, blades spaced from each other and from said support, nuts engaging said screw threaded arms and adapted to position the blades in a lateral position, the blades being slotted and the arms seated in the slots providing for adjustment at right angles to the arms, yokes extending laterally from said support and engaging said blades and screw means for adjusting said yokes to determine the vertical adjustment of the blades.

In testimony whereof I affix my signature.

THOMAS H. LODGE.